United States Patent

[11] 3,623,040

[72] Inventors Robert W. Erickson
Pacific Palisades;
Harvey R. Fields, Hawthorne, both of Calif.

[21] Appl. No. 836,230
[22] Filed June 25, 1969
[45] Patented Nov. 23, 1971
[73] Assignee Scientific Data Systems, Inc.
El Segundo, Calif.

[54] DIGITAL DECODING OF REPRODUCED SIGNALS
21 Claims, 3 Drawing Figs.

[52] U.S. Cl. .......... 340/174.1H
[51] Int. Cl. .......... G11b 5/02, G11b 5/44
[50] Field of Search .......... 340/174.1 A, 174.1 B, 174.1 H

[56] References Cited

UNITED STATES PATENTS 3,491,349 1/1970 Seville et al. .......... 340/174.1
3,503,059 3/1970 Ambrico .......... 340/174.1

*Primary Examiner*—Bernard Konick
*Assistant Examiner*—Vincent P. Canney
*Attorney*—Smyth, Roston & Pavitt

ABSTRACT: Representation of the particular characteristic which may define a bit cell and clock signal are derived from the readout signal. Depending upon the recording format, the clock pulses and the readout signals are combined to sequentially establish particular states in a bistable device in representation of the bit held within the bit cell currently read out, usually to be held therein until the value of the next bit has been ascertained. The clock pulse generator is under control of temporarily effective rejection and disabling control means which, after each recognition of a clock pulse and bit cell-defining characteristics in the readout signal, rejects for particular periods of time and subsequently thereto recognition of recurrence of such characteristics for clock pulse production.

INVENTORS:
Robert W. Erickson
Harvey R. Fields
By Smyth, Roston & Pavitt
ATTORNEYS INVENTORS
Robert W. Erickson
Harvey R. Fields
By Smyth, Roston & Pavitt
ATTORNEYS

DIGITAL DECODING OF REPRODUCED SIGNALS

The present invention relates to equipment for processing signals resulting from reading stored digital signals from a movable storage carrier such as a magnetic storage surface. More particularly, the invention relates to such equipment for processing signals read from a high speed, high data density storage carrier, such as a magnetic disk.

High speed magnetic storage surfaces such as disks are used today in data processing systems, such as digital computers, as rapid access memory extension thereof. Data are recorded on such disks in tracks and in a self-clocking format. This means that a particular characteristic is periodically recorded on a track to define thereon the data bit rate and, therefore, the clock pulse rate. The track increment in between two sequential occurrences of such particular characteristics can be regarded as a bit storage cell or storage location. That location can be "filled" with additional information representative of bit value.

The particular characteristics used here are usually a change in the direction by 180° of saturation magnetization of the carrier along the track. Thus, a sequence of regularly spaced magnetic flux reversals or transitions define the bit cells. Usually, absence or presence of an additional magnetic flux direction reversal in such a bit cell is of digital, bit value establishing significance. During readout, each magnetic flux direction reversal on the moving storage carrier as monitored by a usually stationary electromagnetic transducer causes a voltage peak to be induced in the output circuit of the transducer. The voltage peak has polarity depending upon the direction of the flux direction reversal on the track as it passes the transducer means. Of course, the flux changes in opposite directions in sequential transitions on the track so that the transducer output are AC waves. Peaks and valleys of the readout signal follow each other at a rate which, for a particular speed of the storage surface past the transducer, is determined by the spacing of such reversals or transitions along the track. The spatial distribution frequency of reversal points or transition zones along the track are then represented by temporal frequencies of the readout signal waves.

The density of bit cells is also called the packing density, and is usually quantitatively expressed in bits-per-inch on the track. In view of the foregoing, it will be observed particularly that in the readout signal train a positive or a negative voltage peak is respectively always followed by a negative or positive voltage peak. Theoretically, if the period of time between the former peak and the latter peak equals the ratio of the bits-per-inch value over the disk speed, both of the peaks represent bit cell defining transitions. If that period is half that value, one of the peaks represents a bit cell-defining flux reversal and the other peak represents an additional, bit value establishing flux reversal.

In order to properly process these readout signals their digital significance must be ascertained to permit formation of a digital data train. Thus, it is necessary to distinguish between signal excursion peaks representing bit cell and clock rate defining flux reversals and the additional flux reversals on the record carrier establishing bit values. As the polarity of all of the peaks cannot be used to make such distinction, such discrimination will, instead, be based essentially on metering periods of times which have elapsed between sequential excursion peaks and valleys.

It should be noted that for low speeds and low data packing densities, there usually is a flat signal portion between two sequential signal peaks of opposite polarity, i.e., the signal swing from one polarity to the opposite one usually does not traverse the zero line at a steep angle representative of a maximum or minimum in the rate of change of the output signal. This is quite different for high speed high packing densities envisioned here, where such flat portions in between peaks of opposite polarity can hardly be expected.

High packing densities of data and high disk speeds are required for such rapid access disk files. This leads to output signal frequencies in the megacycle range. It has been observed here that output signal peaks are displaced (in time) relative to each other in those cases in which there are two bit cells as defined by three flux direction reversals and only one such cell contains an additional flux reversal. The four peaks result in four voltage peaks which, however, are not equally spaced. Instead, among the four peaks there are three peaks, two of which are spaced a clock period apart and the third peak follows or succeeds the two at half that time. However, signal peak displacement tends to extend the short period to correspondingly shorten the longer one of the two periods by displacement of the middle one of the three. This signal peak displacement is also called bit crowding.

Aside from the foregoing, it has to be considered that the readout curves are subject to other distortions, such as incomplete previous erasure, abrasions and flaws of the magnetic surface, variations in the distance between transducer and surface, speed variations of the magnetic storage carrier, crosstalk between transducers scanning adjacent tracks, etc. Thus, it is difficult, and in cases seemingly impossible, to consistently differentiate between clock and bit cell defining excursion peaks in the readout signal on one hand, and bit value establishing peaks thereof, on the other hand. Such differentiation is absolutely necessary, because interpretation of an additional signal peak as a bit cell defining peak or vice versa will inevitably lead to incorrect data reproduction. Moreover, reproduction of the clock as the bit rate defining representation is essential for proper data assembly.

It is a principal object of the present invention to improve on the readout and decoding of such readout signals so as to differentiate with certainty between the clock and bit cell defining characteristics of the readout curve, on one hand, and bit value establishing characteristics, on the other hand, even through the originally intended temporal differentiation as between sequential signal peaks may, within small portions of the readout signal trace, become almost completely eliminated. It is another, more general object of the present invention, to improve processing of signals which have resulted from recordings on a high speed, high data density record carrier and in a self-clocking track thereon.

It is an essential characteristic of the present invention to employ digital decoding techniques for processing the readout signal, using already processed signals in order to provide with certainty a pulse train which represents the flux bit rate in the self-clocking recording on the track as reproduced. The processing equipment is designed to permit with certainty sequential bit value detection in response to such clock pulses, whereby already established and obtained bit values control the exclusion of those signal excursions attributable to the above-defined additional flux reversals and signal peaks from the clock pulse production, and the bit value detection operates with certainty in synchronism with the produced clock pulses thus produced.

A particular difficulty arises from the fact that the peak displacement may occur because of the particular relationship between the bit value in the currently read bit cell, and the bit value in the preceding bit cell and/or in the succeeding bit cell, the content of which is (are) not yet known. It is a feature of the invention to establish rules for compensating for the peak displacement in such a manner that the succeeding bit value does not have to be considered.

In accordance with the preferred embodiment for practicing the invention, it is suggested to derive, from the readout signal, representation of the particular characteristics which, per se, may define a bit cell and clock signal, or which may be of digital value establishing significance. Potentially, each such characteristic is used to produce a clock pulse. Depending upon the recording format, the clock pulses and the readout signals are combined to sequentially establish particular states in a bistable device in representation of the value of the bit held within the bit cell currently read out, usually to be held therein until the value of the next bit has been ascertained.

The particular interpretation of the readout signal for that purpose depends on the recording format used. The clock pulse producing means are under control of temporarily effective rejection and disabling control means which, after each recognition of a clock pulse and bit cell-defining characteristics in the readout signal, rejects for particular periods of time and subsequently thereto, recognition of recurrence of such characteristics for clock pulse production. Should such characteristics occur within the rejection period, it will be attributed to an additional bit value establishing recording characteristics ad defined above.

For a particular recording format, the bit value or values of sequential bits are indicative of whether or not and in which direction a displacement of the characteristics due to the above-mentioned bit crowding, could occur. These relationships can be established with a high degree of certainty, and their resultant detection is used to control the duration of the period of disabling and rejection, so that the recurrence of the particular characteristics is tracked even though it may possibly be displaced in relation to preceding and/or succeeding one of such characteristics.

In response to detected digital values of the reproduced recording up to the time a decision has to be made whether or not this period of inhibition could be extended from a minimum value, such as decision is made to control the period of inhibition, disabling and rejection, and this period is controlled in response to such decision. As a consequence of this operation, the period of rejection and disabling of the particular characteristics for producing clock pulses, will be controlled so that it does not extend up to a time a particular clock and bit cell defining characteristic happens to occur too early. Depending upon the recording format the detection of at least one or two particular bit values is required, prior to the time a decision on extension of the rejection and disabling time had to be made.

For particular bit values the disabling period is controlled to remain short, if the bits, as encoded, have resulted in placement of the particular characteristic, the reproduction of which may occur too early. Conversely, the period of rejection and disabling will be extended if, on basis of the digital information available up to the time the decision has to be made, it was found that a particular characteristic to be rejected may occur belatedly. As a consequence of the fact that the succeeding bit is not known by the time the decision as to extension has to be made, the rules governing the extension must be selected so that in cases possibly the disabling period is unnecessarily extended but these cases can be clearly defined and, as will be shown below, they can be made to fit into a general pattern for rules governing the formation of the duration of the disabling and reject period. It was found that a short blanking period is to be selected if the current and the preceding bits have similar value, and for two dissimilar bits the period has to be selected if the current and the preceding bits have similar value, and for two dissimilar bits the period has to be extended; this applies to the Manchester format. For the frequency doubling format the blanking period is to be short if the previous bit cell held a bit identified by an additional transition, the blanking period is to be extended if the previous bit had the respective other value. Generally speaking, a short blanking period is selected if the previous bit cell did hold an additional transition, the long period is selected if not. In other words, the rule is, select the length of the blanking period to succeed the detection of a clock pulse defining transition in accordance with the digital representation of absence or presence of a preceding half-bit cell spaced additional transition.

In the Manchester code occurrence, per se, of that transition is not detected directly but indirectly by ascertaining the direction of the flux as representing the value of the current bit shortly after the leading bit cell defining transition thereof, and if the current bit is similar to the previous bit there was an additional transition; if dissimilar then the previous cell did not hold an additional transition. In the frequency doubling format occurrence of an additional transition, per se, is usually detected as part of the decoding process which gives the value of the previous bit and this is sufficient to decide on the duration of the blanking period for the current cell.

A word of caution as to terminology should be interjected. The Manchester format is sometimes interpreted by regarding the one transition per bit cell as having been placed in the center, rather than a boundary of the cell, and additional transitions, if any, are then considered on the boundary. This interpretation does not change the principles involved here except that "cell center" has to be substituted for "cell boundary" as used here.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawing in which:

Figure 1:
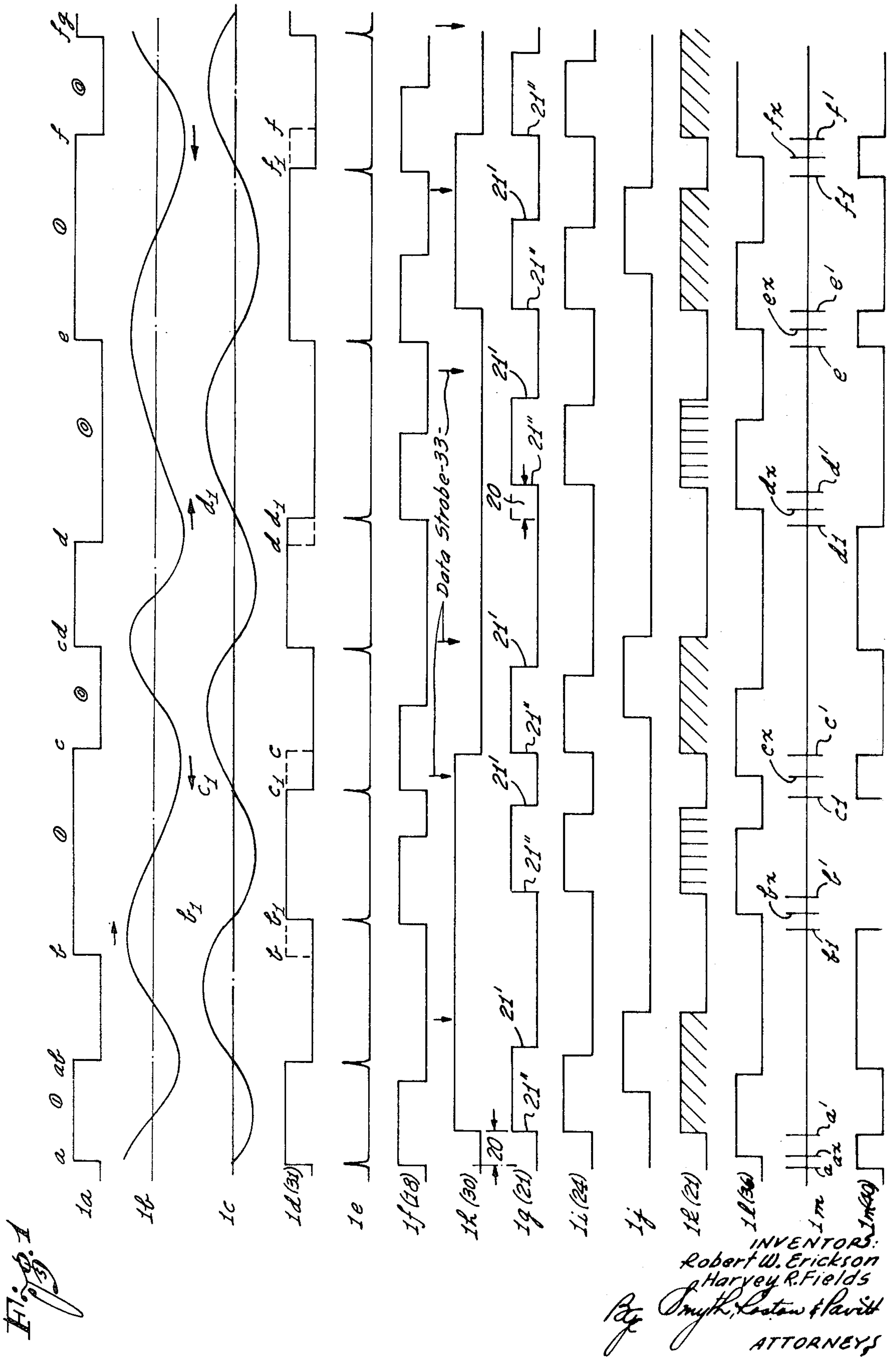
FIG. 1 illustrates in diagrams 1*a* through 1*m*, plotted in vertical alignment, various signals relevant for a system for practicing the invention, by way of example, whereby FIG. 1 includes additional traces permitting a better understanding of the problems involved and of the consequences if the invention is not being used.

The problem outlined more generally above will be understood best with reference to specific examples, and for this we turn to the detailed description of the drawings and here, in particular, to FIG. 1. FIG. 1*a* illustrates by way of example, a representation for the magnetization along the data track on a magnetic storage surface such as a disk. The trace, as plotted, delineates a pulse sequence whereby, for example, more positive signal values denote magnetization, preferably saturation magnetization, in one longitudinal direction along a data track, whereas the more negative signal values present saturation magnetization in the opposite direction. It follows therefore, that each vertical portion of the signal train plotted in FIG. 1*a* defines a transition zone where the magnetization changes direction. In case a self-clocking recording format is used, as it is assumed here, there will be transitions, i.e., flux reversals on the track at a regular rate. They appear on what is described as a spatial clock frequency on the track. Such clock transitions also define and separate bit storage cells, i.e., bit locations, along the track. The various curves in FIG. 1 are plotted against time, but FIG. 1*a* has also significance as showing spatial distribution along a track. On the other hand, the various transitions will pass a readout transducer in accordance with the assumed time scale.

In FIG. 1*a* magnetic flux reversals or transition zones occurring at corresponding times-track-locations *a*, *b*, *c*, *d*, *e*, and *f*, are such regularly spaced transitions defining clock rate and bit cells. As the bits to be recorded are usually bivalued ones, a distinction has to be made as to the bit value in each bit location and cell thus defined. For purposes of providing such bit value distinctions, additional transitions are placed about halfway between the clock and bit cell defining transitions.

The particular placement of these additional transitions depending upon the recording format employed. For example, in case a so-called frequency doubling method is used, an additional transition when present, for example, defines a bit value "zero", whereas absence of an additional transition between two bit cell and clock defining transitions denotes a bit value "1." In the Manchester-type format, the placement of additional transitions does not have immediate bit value defining significance. Instead, transitions are placed to the extent they are needed, so that the magnetic flux has particular direction immediately succeeding a bit cell defining transition. Thus, there is direct correlation between bit value and magnetization direction succeeding a bit cell defining transition. The additional transitions are needed only to establish the correct direction of flux change at the next bit cell defining transition to arrive at the desired flux thereafter in dependence upon the bit value to be recorded. This recording format is used in the method and preferred system described as incorporating the principles of the invention.

As one can see, particularly from FIG. 1*a*, a bit value "one" is defined by magnetization direction, which is represented, for example, by a positive signal excursion following a bit cell defining transition, while the opposite flux direction following an oppositely directed bit cell defining transition represents a binary "O." It follows, therefore, that in this type of format, a sequence of alternating unequal bits does not require additional transitions, whereas sequences of equal bits, "1's" or "0's", require similar flux direction after each bit cell defining transition and this, in turn, requires placement of additional transitions in either case. Particularly, then, in FIG. 1*a*, the bit values in cells respectively succeeding transitions *a* through *f* are, 1-1-0-0-1-0. The additional transitions used for establishing bit values in FIG. 1 are denoted as *ab* and *cd; fg* is a further additional transition.

Figures 2, 3:
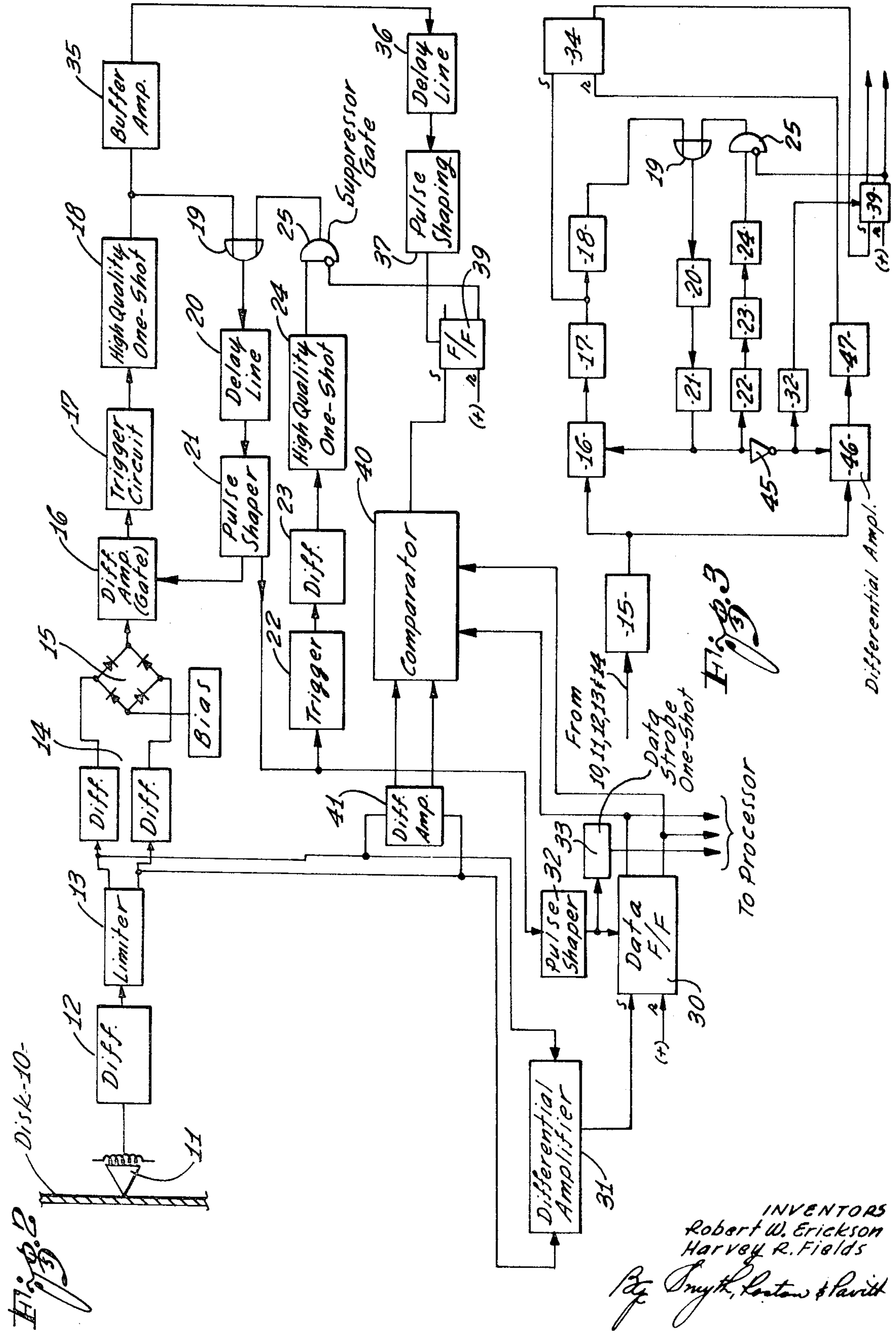
FIG. 2 illustrates a block diagram of a readout and clock pulse producing circuit in accordance with the preferred embodiment for practicing the invention.
FIG. 3 illustrates by way of example, how the system of FIG. 2 can be adapted to accommodate the readout process to a different recording format.

Turning now to the description of the preferred embodiment of applicant's present invention, reference is made to FIG. 2 showing, for example, a disk 10 which has a magnetic layer with exposed surface and having a digital data track of the type shown in FIG. 1*a*. This track is scanned by a transducer 11, reproducing the several transitions as voltage excursions of one or the opposite polarity, depending on the direction of the transition.

An individual transition, spaced apart from others by large distances, is reproduced as a voltage excursion having contour approximately of a gaussian distribution function, the peak thereof occurring when the transition has symmetric position to the transducer. Aside from the gap width of the transducer, speed of the record carrier and magnetic properties thereof determine the width of that readback peak, i.e., how pronounced that peak is, how far the sloping portions extend from the center. If the transitions are not too closely spaced, the several readback excursions do not influence each other. However, if the transitions are spaced closer, flanks of the several peaks begin to overlap, and as sequential excursions have opposite polarity, they begin to cancel partially. The degree of cancelation depends on the three parameters transition density, speed and magnetic properties. Moreover, if the readback excursion is flanked on either side by differently far spaced excursions of opposite polarity and at least one is spaced (in time) so that there is a partial significant overlap and cancelation, the center peak will be asymmetrically distorted and this, in turn, produces the local peak displacement.

In digital terms, if the bits are spaced rather far apart, i.e., if the bit cells are rather long (so that the problem of bit crowding does not occur), or, if the reproduce speed is not too high, readout signals produced by electromagnetic transducer 11 upon reading the track on which the signal shown in FIG. 1*a* is recorded, has configuration as shown in FIG. 1*b*. Each transition produces a maximum or a minimum in the readout voltage, depending upon the direction of the transition in association with the polarity of the signal at the output terminals of the transducer. For a partial merging of the individual readback excursions on their edges, the curves become distorted so that they begin to assume or approximate sinusoidal waveform.

If there is no bit crowding, readout signal peaks occur in time-spatial relationship at points *a, ab, b, c, cd, d, e, f,* and *fg*. This means, in particular, that the readout signal is a sequence of waves having a particular wavelength in case there are no additional transitions and half that wavelength if there are additional transitions. A wave over the full wavelength of this type is, for example, plotted between phase points *d, e* and *f*. The frequency of these waves at full wavelength is half the clock pulse frequency of the self-clocking data track upon reproduction. If, however, there are sequences of bit cells with additional transitions, then there are waves having half that wavelength or the fundamental clock pulse frequency itself, as shown between *a* and *b*, or *c* and *d*.

It follows from the foregoing that in an undistorted readout signal, a maximum or a minimum is respectively followed by a minimum or a maximum, either after a period of time $\Delta T$ or after the period $\Delta T/2$. Thus, without any signal distortions, it is basically simple to distinguish among bit cell defining transitions and bit value establishing, additional transitions. If a maximum or a minimum of the readout curve, which has been recognized as being associated with a bit cell defining transition, is succeeded by a minimum or maximum after the time $\Delta T$, then that succeeding minimum maximum represents the next bit cell defining transition. If, however, the next minimum or maximum follows already at the time $\Delta T/2$, then that latter transition having produced the minimum or maximum is a bit value establishing transition. Therefore, observing these regular occurrences of transitions, bit values will be established and bit cells will be regularly defined.

Bit crowding now results from the fact that in case the transitions are too closely spaced and/or the speed of the record carrier is too fast, the maxima and minima are, in some cases, displaced in time. This is particularly the case if a low frequency signal as defined above is preceded by a high frequency signal, or vice versa. The peak of a half-wave of a low frequency signal adjoining a half wave of a high frequency signal is displaced away from the peak of the high frequency signal. This means, in effect, that, for example, in FIG. 1*b*, the readout curve will not have the peak at the time *b* but, as indicated by the arrow, somewhat later, for example, at the time *bl*. A minimum which should occur at time *c* will occur somewhat earlier, such as time *cl*. and the minimum which should occur at time *d* will occur somewhat later, such as time *dl*, etc.

The various peak displacements as they occur in reality in the readout signal of transducer 11 are denoted by arrows affixed to the respective extremities in FIG. 1*b*. Such a displacement has an effect of an apparent lowering of the frequency of a high frequency signal with a corresponding increase of the low frequency signal in case two such signals follow in sequence. As far as signal recognition, decoding and evaluation is concerned, this means that a particular maximum or minimum which should follow a preceding minimum or maximum at the particular time $\Delta T$ may follow at period which is larger than $\Delta T/2$ but smaller than $\Delta T$, so that without further measures it may become impossible to recognize whether that signal peak represents a bit cell and clock or an additional transition.

It is repeated here, as mentioned above, that bit crowding is not the only source which provides distortions of the readout signal. Flutter and WOW, manufacturing tolerances, in the transducer and the record carrier, incomplete prior erasure crosstalk etc., all influence the readout signal to have a much higher content of harmonics than the trace of FIG. 1*b*, contributing further to peak displacement.

The output signal of the transducer 11 is fed to a differentiator 12 providing a signal as shown in FIG. 1*c* for the actual transducer readout signal resulting from reading the track portion holding recording as shown in FIG. 1*a* and plotted in vertical alignment on the same time scale in respect thereto. The output of differentiator 12 is passed to a limiter or square wave generator-inverter 13, having a two-phase output. One of the output signals has configuration as shown in FIG. 1*d*, and the respective complement thereof is provided in the other output line of limiter 13. The particular object of the arrangement of 13 is to restore as much as possible the signal waveform which represents the magnetization waveform of the data as shown in FIG. 1*a*.

The solid traces particularly of the curves in FIGS. 1*c* and 1*d* show the phenomena of bit crowding, while the dotted trace portion introduced into the signal train of FIG. 1*d* shows what the signal should have been without the effect of bit crowding. The peak displacement is particularly noted at pulse flanks *bl*, *cl*, and *dl*, and *fl*, respectively displaced from the correct phase points *b*, *c*, *d* and *f*. In general, the pulse flanks in FIG. 1*d* at phase points *a*, *bl*, *cl*, *dl*, *e* and *fl* represent bit cell and clock defining transitions of the recording as actually reproduced; pulse flanks at *ab*, *cd*, and *fg*. in FIG. 1*d* represent reproduced additional transitions.

In view of the fact that the Manchester format is employed, the signal level in the limiter output curve after a pulse flank corresponding to a bit cell defining transition determines the bit value of that cell. The two-phase output signal of limiter 13 is fed to a differential amplifier 31, one output of which is continuously applied respectively to the set input side of a data flip-flop 30, receiving clock signals at particularly selected instants. The data flip-flops of the set-override-reset type; an example for such flip-flop-type is disclosed in copending application, Ser. No. 460,408, abandoned in favor of continuing application Ser. No. 28,181, of common assignee and as traded under the designation SDS 307 or SDS 311. The reset input of the data flip-flop is permanently enabled, but the flip-flop sets on falling clock when a set input is applied, while resetting when a set input is not applied. The clock signal is particularly derived from the bit cell defining transitions and readout pulse edges representative thereof. That clock signal is, or is converted into a strobing and/or sampling signal and must occur each time after a reproduced bit cell defining transition and before a reproduced additional transition may occur.

The principal problem can now be redefined as follows. The signal edges or pulse flanks corresponding to reproduced bit cell defining transitions at phase points *a*, *bl*, *cl*, *dl*, etc., of the limiter output curve shown in FIG. 1*d*,have to be detected with certainty as bit cell and clock pulse defining transitions to derive clock pulses therefrom. Conversely, any pulse edges of the processed readout curve and occuring in between two reproduced bit cell defining transitions must not be recognized as bit cell defining transitions and must not produce clock pulses, otherwise the decoding system will drop out of synchronism. Thus, for a period beginning with each bit cell defining pulse edge, such as *a*, *bl*, *cl*. *dl*, *e*, *f*, etc., there must be provided a blanking interval covering periods during which in-between transitions, such as at *ab*, *cd* and *fg* may occur, in order to prevent limiter signal edges at those times from producing clock pulses for data flip-flop 30. Such a blanking period, therefore, must be long enough to cover with certainty the instant where an in-between transition is expected to occur, and where transitions *ab*, *cd*, *fg*, etc., actually do occur. The blanking interval must not be so long that it actually extends to times where bit cell defining transitions occur.

The specific problem can clearly be discerned from a closeup inspection of the trace in FIG. 1*d*. The distortion assumed here is such that the time interval *bl–cl* is actually shorter than the time interval *ab–bl*, even though the former time interval occurs in between two reproduced bit cell defining transitions while the latter time interval occurs between a bit reproduced cell defining transition and a reproduced in-between transition.

If such a blanking period begins at edge *bl*, which has been recognized as a bit cell defining transition, it must not extend up to the time of the somewhat earlier occurring edge *cl*, which also defines a bit cell, as blanking of that edge in the clock generation circuit causes that edge not be recognized as a bit cell defining edge, though it should. Conversely, too short a blanking period succeeding *cl* may cause bit value establishing transition *cd* to be recognized as bit cell defining transition, which is incorrect. In either situation, the system would drop out of synchronism. The prevention of such incorrect blanking is thus the specific object of the invention.

The peak and limiter pulse edge and pulse duration displacement distortion is a specific AC phenomenon due to the specific electrodynamic readout process as was outlined above. Nevertheless, it has been found advisable to correct bit crowding distortion and to eliminate the possibility of readout errors as a result of bit crowding, by using strictly digital techniques, as for a particular decoding format, particular bit value sequences can be expected to produce particular distortion patterns. For this, the AC readout signal must be interpreted digitally, i.e., decoded. Peak displacement, as defined, will be more and more noticeable, the higher speed, but for different magnetic materials producing differently pronounced excursions as reproduction of an individual transition, peak displacement is noticeable to a different degree for the same speed. If the system operates under conditions where peak displacement can occur, the specific condition under which it will occurs when there is a change in frequency, i.e., if, in the readout curve, a higher frequency half wave is succeeded or preceded by a lower frequency half wave, or vice versa.

In the case of the Manchester recording format, such change in frequency does not occur for a series of similar bits, resulting in a sequence of readout signal waves having consistently higher frequency; a series of regularly alternating "1 " and zero bits produces a wave train of consistently lower frequency. A change in frequency occurs when two similar bits are preceded or succeeded by a dissimilar bit. This actually involves three bits, but dangerous peak displacements can occur before the valve of the last one of such three bits is available.

For example, in FIG. 1*a*, the peak corresponding to transition *c* is shifted to the earlier phase point *cl*, because of the additional transition *cd*,which, in turn, is needed because a zero, rather than a "1," is recorded following transition *d*. It is obvious, however, that the bit value following phase point *d* cannot be taken into consideration to meter the blanking period to succeed transition *cl* as its value is not "known" by the time the decision has to be made. However, it was found that such third bit value anticipation is not needed for the following reason.

If two bits have been detected as having similar values, the blanking interval succeeding the bit cell defining transition and pulse edge for the second one of the two bits must be relatively short, if the third bit thereafter is similar to the two previous ones. The blanking interval in question can be short if the third bit is a dissimilar one, provided this short blanking interval is still long enough to cover the instant of a reproduced, additional transition following reproduced bit cell defining transition without displacement.

The blanking interval succeeding a reproduced bit cell defining transition for the second one of two dissimilar bits must be relatively long, if the third bit thereafter is similar to the first one. The blanking period can be long if the third bit is similar to the second one. The term "long" actually means possibly longer than the period in between two oppositely displaced reproduced bit cell defining transitions with no additional transition in between, but that latter situation cannot possibly occur if two dissimilar bits follow each other, regardless of the value of the next bit.

It follows from the foregoing that the determination of the third bit value is not needed to establish the appropriate duration for the blanking period. The choice between two differently long blanking intervals can be made in accordance with this rule: Select the short one if the current bit has the same value as the preceding bit; select the long one if the current bit is dissimilar from the preceding one. If one observes these rules for determining the duration of the blanking interval used to suppress peaks from which clock pulses for the data flip-flop are not to be derived, any peak and pulse edge displacements, should they occur, will not find an improperly proportioned blanking interval.

Turning to the description of the clock producing circuit in FIG. 2, the two-phase output of limiter 13 is differentiated by a pair of differentiators 14, feeding a full wave rectifier 15, the output of which are spikes shown in FIG. 1*e*. These spikes are passed to a differential amplifier 16 operating as a gated amplifier, and the development of the gating signal is carried out under rules given by the inventive concept.

The differential amplifier 16 determines which of the spikes are to be recognized as bit cell-defining spikes to produce the clock pulses for the data flip-flop 30. For the readout signal in FIG. 1 this will be the spikes at phase points *a*, *bl*, *cl*, *d*, *e* and *fl*. The output of differential amplifier 16 feeds a trigger circuit 17 operating as pulse shaper to provide signals at a more suitable level, and the output of trigger circuit 17 triggers a first, high quality one-shot or monovibrator 18. The term "high quality" refers to capabilities for producing sharp rise times and falling edges, and a highly constant, astable period. FIG. 1*f* illustrates the output of single shot 18.

The output of single shot 18 is fed to one input of a two-input circuit 19, operating as an OR gate and transmitting this signal to a delay line 20 for delaying input signals for a particular period. The delay line output is squared by a pulse shaping network 21, and the resulting output is shown in FIG. 1*g*. The particular delay period as provided by the delay line 20 is discernible from the drawing by comparing FIG. 1*f* with FIG. 1*g*. The output signal of the delay line-pulse shaper circuit 20–21 is fed to a pulse shaping-inverting circuit 32, the output of which serves as clock pulse for data flip-flop 30 constructed as falling clock trigger. In other words, the inverted waveform of FIG. 1*g* is the clock pulse train for the flip-flop.

A one-shot 33 is connected to pulse shaper-inverter 32 to respond to the leading edge of each clock pulse it produces. Therefore, the one-shot 33 produces a pulse beginning at each signal flank 22'' and ending as indicated by arrows in FIG. 1*h*. The timing of these strobe pulses are referenced against the state of the data flip-flop 30 on a periodic basis. These strobe pulses essentially signal to an external device that a new data bit is now available in data flip-flop 30 and can be used externally for gating out this data bit.

FIG. 1*h* shows the resulting state of data flip-flop 30 for the particular input signals as provided to its set and reset inputs by limiter 13 (FIG. 1*d*). The clock generator proper 32, which inverts the output of 21 (see FIG. 1*g*), thus provides the clocking and strobing signals respectively at phase points *a'*, *b'*, *c'*, *d'*, *e'* and *f'*, and respectively succeeding the phase points *a*, *bl*, *cl*, *dl*, *e*, and *fl* for a period equal to the delay period of delay line 20. This period, however, is shorter than the shortest expected interval between any two succeeding reproduce signal peaks as attributable to a bit cell-defining transition and an additional transition the record carrier. The output of the limiter 13 is, therefore, sampled and clocked into data flip-flop 30 at a time succeeding a reproduced bit cell-defining transition and before a reproduced additional transition can occur. By definition of the Manchester format, the signal level at about such a time, defines, in effect, the bit value itself.

The output signal of the delay line as provided by pulse shaper 21 is used next as control signal for the gating terminal of amplifier 16. Assuming amplifier 16 to be a differential amplifier, then the output of pulse shaper 21 will be the second input for that amplifier, the first one being, of course, provided by the rectifier 15. The control is now such, that for the delayed signal of one-shot 18 the differential amplifier is regarded as being closed for signal spikes as being derived from rectifier 15. This holds true under all circumstances so that any spikes occurring during the delayed signal as derived from one-shot 18 are suppressed and will not reach trigger circuit 17.

It should be emphasized that the curve in FIG. 1*g* must be interpreted as showing the output of delay line 20 only where the input of delay line 20 is derived solely from one-shot 18. In other words, FIG. 1*g* is the output of delay line 20 after pulse shaping to the extent an input for the delay line is attributable to one-shot 18. The delay line period is selected so that the falling edge of that delayed one-shot output occurs positively subsequent to a spike corresponding to an undisplaced reproduced bit value establishing, in between transitions such as *ab* (but not *cd* or *fg*). Hence, the delayed output of one-shot 18 suffices to suppress the spike (FIG. 1*e*) at phase point *ab* so that that spike cannot reach the input of one-shot 18.

To facilitate description, the falling edges of the delayed signals of one-shot 18 are all identified by reference numeral 21'. The delay period, together with the astable period and signal duration of the single shot 18 are selected so that the falling edges of 21' will occur before a reproduced transition attributable to a bit cell defining transition, even if under rather severe distorting conditions such a peak occurs too early. This is particularly the case with regard to the reproduced transition at phase point *cl*, where the preceding reproduced bit cell defining transition occurred late at *bl* and the next one occurred early at *cl*. Hence, the time period between *bl* and *cl* is shortened considerably because of relative peak displacement but not below the period between *cl* and the succeeding flank 21'. This, in effect, establishes a limit on the duration of the period beginning with a phase point at the leading edge of the output signal single shot 18 and ending at phase points 21'. On the other hand it can be seen from FIG. 1*g* that falling edges 21' occur before reproduced bit value establishing transitions such as *cd* or *fg* as displaced relative to the respective preceding reproduced bit cell defining transition; with this we proceed to the description of the blanking period extension as needed in these cases.

It is thus established by the foregoing that the blanking period as provided by the output signal of pulse shaper 21 as serving as an inhibiting input signal for the differential amplifier 16, does not cover all possible periods of occurrence of spikes representing reproduced bit value establishing transitions *cd* and *fg*. The output of the pulse shaper 21 is, therefore, fed to another trigger circuit 22, the output of which is fed to a differentiating circuit 23. The spike resulting particularly from differentiation of the leading edge of the delayed output of one-shot 18 (at phase points *a'*, *b'*, *etc.) triggers another high quality one-shot 24 connected to differentiator 23 accordingly. The spikes resulting from differentiation of trailing edges 21' of the delayed output of one-shot 18 has a polarity which does not admit triggering of one-shot 24, there being no rectification provided accordingly.*

The output signal of one shot 24 is shown in FIG. 1*i*. Each of these pulses are fed to a gate 25 and pulses permitted to pass the gate when open serve as an alternative input for OR-gate 19. This means that the pulses of the sequences shown in FIG. 1*i* and to the extent that they are permitted to pass through gate 25, are delayed by delay line 20 for the same period of time the output of single shot 18 was and is delayed. The FIG. 1*j* illustrates the delayed output for the single shot 24, and it will be appreciated that this is a signal which, as far as output of the delay line 20 and pulse shaper 21 are concerned, is a signal as attributable to the delay line input as derived from one-shot 24.

Two points are important. First of all, not all pulses produced by a single shot 24 are permitted to pass gate 25. Second, the duration of the astable period of one-shot 18 is larger than the delay period for delay line 20 so that always the leading edge of an output pulse of gate 25 occurs before the trailing edge of the undelayed output of one-shot 18 appears at the input of delay line 20. It follows, therefore, that an output pulse of single shot 24 is overlapped and tacked onto the input of delay line 20 as derived from single shot 18 in those cases where gate 25 does not suppress the output of single shot 24.

As a consequence, the total output of delay line 20 as derivable from pulse shaper 21 is as shown in FIG. 1*k*. The signal train plotted in FIG. 1*k* is thus the actually effective blanking signal for amplifier 16. In case gate 25 is closed, single shot 18 is the sole source for the output pulse of delay line 20 and pulse shaper 21. In these cases the blanking signals beginning at phase points *b'* and *d'* in FIG. 1*k* have shorter duration, and the pulse as shown in FIG. 1*g* after phase points *b'* and *d'* is then the same as the pulses shown in FIG. 1*k* as beginning at these phase points; these pulses are indicated by vertical hatching in FIG. 1*k*.

The duration of the delayed signal of one-shot 24 is selected long enough so that in case of a reproduced bit cell defining transition such as *cl* or *el*, which appears somewhat too early, still extends through the occurrence of the now relatively late reproduced additional transition *cd* and *ef*. The extension of the blanking period after phase point *el*, though not needed, is not harmful as in this particular situation, i.e., after the "zero" bit in the cell following *dl* and the "1" bit in the cell following *c*, the next bit cell defining transition (*f*) could not be displaced excessively relative to phase pint *e*, even though it could be displaced to some extend, as shown at *fl*.

On the other hand, one can readily see that, for example, the trailing edge of a delayed pulse from one-shot 24 plotted in dotted lines in FIG. 1*k*, if it were permitted to pass, would extend the blanking and disabled period of amplifier 16 to extend to the time, for example *cl*. Therefore, one can readily see by comparing the spikes and transitions at *bl*, *cl* and *cd* that subsequent to *bl* a short disabling period is needed, a long one would cause the spike (FIG. 1*e*) at phase point *cl* to be blanked and suppressed by amplifier 16 which, in turn, would throw the system out of synchronism, as the spike, (FIG. 1*e*) at *cl* is needed to produce a clock pulse at *c'* for data clocking, as described. Conversely, subsequent to *cl*, and if the short blanking period were used, the spike at *cd* would not be suppressed and would, in fact, produce a clock pulse at a time such a clock pulse must not be produced as the limiter output may have level which is not representative of bit value and again the system would be thrown out of synchronism.

It should be noted that the output of single shot 18 reverts to the stable state before the blanking period for amplifier 16 terminates, the delay being, at least for the short blanking period, also equal to the delay period of delay line 20. This allows single shot 18 to recover before it can be triggered again.

In accordance with the general rules expounded above, the suppressor gate 25 is controlled in a manner that permits the signal from one-shot 24 to pass if there are two bits having dissimilar values in a row. Gate 25 is closed, and the output of one-shot 24 is suppressed from being tacked onto the input of delay line 20, in case two succeeding bits have similar values. Whereby, particularly the value of the second one of such two bits is determined by the limiter output signal level succeeding a reproduced bit cell defining transition and the duration of the succeeding blanking period must then be determined.

As stated, *a'*, *b'*, *c'*, etc., denote the instants in which data flip-flop 30 changes or can change state. This, in turn, means that up to these phase points in time, data flip-flop 30 holds the previous bits. On the other hand, subsequent to the respectively preceding phase points *a*, *bl*, *cl*, the output of limiter 13 is at a value defining the value of the next bit not yet clocked into data flip-flop. Therefore, within each period *a* to *a'*, *bl* to *b'*, *cl* to *c'*, *dl* to *d'*, *e*to *e'*, the value of the preceding bit and the value of the current bit, not yet recognized by the data flip-flop, are available in the system. The preceding bit is in the flip-flop 30, the current bit is represented by the output of limiter 13 and is now sampled additionally prior to clocking into flip-flop 30 and in a manner to be described next.

For this detection there is provided another detection and sampling circuit which is connected to the output of the one-shot 18. A buffer amplifier 35 receives the one-shot 18 signal as plotted at FIG. 1*f*, and feeds it to a third delay line 36 which provides a delay shorter than the delay provided by line 20. The output of delay line 36 is subjected to pulse shaping by circuit 37, the output of which is shown in FIG. 11. This pulse train operates as clock pulse for a flip-flop 39. The flip-flop 39 thus receives as clock pulses the inverted pulses of FIG. 11, whereby the leading edge of each such signal is the trigger edge of the operating clock pulse and occurs at times denoted *a*X, *b*X, *c*X, *d*X, *e*X in FIG. 1. Flip-flop 39 is thus triggered at a point in time respectively in between the time or phase points *a'*, *b'*, and *d'*, *cl* and *c'* , *dl* and *d'*, *e* and *e'*, etc.

The state flip-flop 39 assumes after such clock pulse is determined by signals applied to its set and reset inputs through a comparator 40. Flip-flop 39 is of the same set-override-reset type as the data flip-flop 30. The reset input of the flip-flop 39 is permanently enabled to cause flip-flop 39 to reset at clock pulse time provided a set control signal is not provided by comparator 40.

A differential amplifier 41 has its two inputs connected to the two out-of-phase output lines of limiter 13. Therefore, amplifier 41 receives a signal pair, one of which is a replica of the signals shown in FIG. 1*d*, the other one being the complement thereof. The output of amplifier 41 is one of the two inputs of comparator 40. The second input of comparator 40 is the output signal of data flip-flop 30, as plotted in FIG. 1*h*. Therefore, within a period succeeding phase points *a*, *bl*, *cl*, etc., the comparator 40 compares the preceding bit still held in data flip-flop 30 with the current bit provided by limiter 13, and differential amplifier 41. The comparator 40 may, in effect, simply be an exclusively OR gate, i.e., it provides a true output only, if its two inputs are dissimilar, the output remains false if the two bits have similar value. The output of comparator 40 is plotted in FIG. 1*n*.

For the specific examples shown in FIG. 1 flip-flop 39 will be set at phase points *a*X, *c*X, *e*X and *f*X, as the two bits compared at that time are similar. At times *b*X and *d*X the comparator output is false so that flip-flop 39 will be or remains reset as the bits compared at that time are dissimilar. The flip-flop 39 provides the gating signal for the suppressor gate 25. In accordance with the rules given above, the reset state of flip-flop 39, when true, provides a signal causing gate 25 to close so that as a consequence, for two similar bits the blanking period provided by the amplifier 16 is short and the signal of one-shot 24 is not tacked onto the delayed signal of one-shot 18. In case of two dissimilar bits, flip-flop 39 is set, its reset output is false, causing gate 25 to open, and differential amplifier 16 is closed for the relatively long blanking period now established between delayed leading edge of the signal of one-shot 18 and the delayed trailing edge of the signal from one-shot signal 24 as the latter signal was then permitted to pass the gate 25.

It will be appreciated that the system is self-synchronizing if, for example, at the beginning of a data track there are recorded several bit cell defining transitions without additional transition. The system will fall in synchronism at the latest with the second one of such transitions.

The circuit, as described, is, of course, only an example and the inventive concept can be realized in different ways. A simple modification is readily discernible from the drawings. The gate 25, for example, could be interposed between the output of differentiator 23 and the input of one-shot 24. That means in case the short blanking period is desired, the one-shot 24 is not triggered rather than suppressing its output. Another possible modification involves one-shot 18 itself in contemplation of eliminating one-shot 24 from the circuit. The one-shot 18 may, for example, be provided with a variable time constant as far as its astable period is concerned, there would be a switching network to establish either the long or the short astable period, and such a switching network, in turn, would be controlled from the flip-flop 39. By comparing the various figures, in FIG. 1 one can see that the undelayed trailing edge of one-shot 18 occurs prior to the sampling times, such as *a*X, *b*X, *c*X, etc., for the bit value comparison, so that indeed, such switching operation would be performed timely.

The system as described can be adaptable to the case in which frequency doubling rather than Manchester format is employed for the recording, except that the gating signal for the gate 25 is provided in a different manner and also the output of rectifier 15, as well as the output of pulse shaper 21, are both used in addition and in a different manner. For the frequency doubling method, the situation is such that it is not the signal level succeeding a bit defining transition which determines the value, but presence or absence of an additional transition defines bit values. Whether or not presence of an additional transition represents a "one" or a "zero" is immaterial, but it is conventional that a "zero" is established by an additional transition. The problems of bit crowding are precisely the same as in a Manchester recording format, but the digital representation for the readout peak displacement is different. Considering this, peak displacement produces the situation that the blanking period for the clock pulse production circuit (serving now also as the sampling period for detecting absence or presence of an additional reproduced transition) must be selected in accordance with the following rule for counteracting bit crowding and peak displacement in the AC readout signal: The blanking and sampling period can or must be longer when the preceding bit is a "1," it can or must be shorter when the preceding bit is a zero.

As illustrated in FIG. 3, elements 15, 16, 17, 18, 19, 20, 21, 22, 23, 24 and 25 are connected, as aforedescribed, with reference to FIG. 2. It should be noted that the signal trains of FIG. 1 are valid also for this embodiment except for FIG. 1*h*. Furthermore, the bit values, as plotted and beginning with the cell at phase point *a*, are 0, 1, 0, 1, 1, 0 if the data train of FIG. 1*a* is a frequency doubling format recording.

Turning now to the essential details of FIG. 3, an auxiliary set data flip-flop 34 of the set-reset type is controlled in such a manner that, for example, it is set with each reproduced bit cell defining transitions which are reproduced by the pulses passing through gate 16, which in the timing diagram of FIG. 1 occurs at phase points *a*, *bl*, *cl*, etc. An inverter 45 produces the complement of the blanking signal for differential amplifier 16, to serve as a gating signal in a differential amplifier 46. This differential amplifier 46 is thus enabled whenever amplifier 16 is disabled, and receives and passes only bit value defining transition representing spikes from rectifier 15.

The output of amplifier 46 is processed in a trigger circuit 47 and the output of the latter resets an auxiliary data flip-flop 34. Thus, each bit cell-defining spike sets flip-flop 34 and an additional spike, should it occur, resets the flip-flop. The condition as to the duration of the blanking inhibiting period provided by the pulse shaper 21 as the output element of delay line 20 are such that if there was an additional transition defining a "zero" the blanking and enabling period for the next cell will be short. It follows that flip-flop 34 holds a bit defining state from the end of a blanking and sampling period, which is the trailing edge of each pulse in FIG. 1*k*, up to the next reproduced bit cell defining phase point *a*, *bl*, *cl*, etc. Pulse shaper 32 is connected to the output of inverter 45 to produce clock pulses now at the end of that sampling period, when a reproduced additional bit value defining transition must have occurred if there was one in the particular bit cell. The clock pulse from pulse shaper 32 operates flip-flop 39 which is here the data flip-flop proper and is input controlled from auxiliary flip-flop 34. Flip-flop 39 thus holds a bit at a time when a decision has to be made whether or not to extend the sampling and blanking period in the clock pulse producing circuit. The reset output of flip-flop 39 controls the gate 25 as aforedescribed.

It should be mentioned that in the general sense auxiliary data flip-flop 34 can also be regarded as being clocked even though the flip-flop operates without a particular clocking terminal, but flip-flop 34 is periodically placed into a particular state with each reproduced bit cell defining transition which is the equivalent to clocking. Decisive is that the reproduced additional transitions do not establish periodically the particular (set) state of flip-flop 34, but are sampled separately.

The invention is not limited to the embodiments described above but all changes and modifications thereof not constituting departures from the spirit and scope of the invention are intended to be covered by the following claims.

We claim:

1. In a system for processing signals resulting from reproduction of magnetic recordings of digital signals in a self-clocking format on a recording carrier, there being magnetic flux reversals on the record carrier for defining bit location and additional flux reversals for defining bit values, the system including transducer means for providing signals representing the flux reversals as the record carrier passes the transducer means, the combination comprising:

first means connected to the transducer means for providing a series of clock pulses in response to the signal as provided by the transducer means;

second means including a data flip-flop connected to the transducer means and to the first means and being responsive to the signals and to the clock pulses to establish states in dependence upon the signals and the clock pulses;

third means connected to the first means and operating the first means to prevent production of a clock pulse for a predeterminable period of time after production of each clock pulse;

fourth means connected to the second means and to the transducer means for providing a control signal in dependence upon at least the bit value of the bit prior to the clock pulse; and fifth means connected to the third means and to the fourth means for varying the period of time in dependence upon the control signal.

2. The system as set forth in claim 1, the fifth means controlling the period of time to have one of two particular, different durations.

3. In the system for processing signals read from a record carrier by a transducer means, the signals representing recorded digital signals in self-clocking format, a combination comprising:

first means connected to the transducer means to be responsive to the output signals and including bistable means for sequentially assuming states in representation of the digital signals as represented by the output signals of the transducer;

second means connected to the first means to provide control signals in particular response to the sequential states of the bistable means;

third means connected to the transducer means and responsive to recurrence of a particular characteristic in the output signal to provide a clock pulse train in response thereto;

fourth means connecting the third means to the bistable device to operate the bistable device in response to the clock pulses of the train; and fifth means connecting the second means to the third means to disable responsiveness of the third means to the particular characteristics for variable periods respectively succeeding each particular characteristic to which the third means is able to respond, the variable period being determined in dependence upon the control signal.

4. In combination with a transducer coupled to a movable storage carrier for reproducing recorded digital signals and providing a signal train in representation of such reproduction;

first means connected to the transducer for deriving from a particular characteristics of the signal train, a train of clock pulses and including means for suppressing the production of clock pulses in response to the particular characteristics during particular phases in relation to each produced clock pulse of the train;

second means connected to the transducer and the first means for deriving digital data signals from the signal train in synchronism with the clock pulses; and means for controlling the suppression of clock pulse production in response to the digital signals.

5. In a system for reading and processing digital signals recorded on a carrier in a format which includes clocking and bit value representing signals;

first means coupled to the carrier to produce a train of signals individually representative of clock signals and bit values, as recorded on the carrier;

second means connected to the first means and particularly responsive to signals for recognizing particularly the signals which are representative of clock signals, to the exclusion of the signals representing bit values;

third means coupled to the second means and responsive to the clock signals representing signals to provide suppression control signals to the second means for excluding the bit value representing signals; and fourth means connected to the first and to the second means for producing a train of data signals and further connected to the third means for periodically controlling the suppression signals in response to the data signal train and in synchronism with the signals representing clock signals.

6. In combination for processing signals read by a transducer from a recording of digital signals in a self-clocking format, including a periodically recurring particular characteristic and further including selectively interspaced characteristics;

first means connected to the transducer to provide a signal train representing the digital data in a format being a replica of the recording format;

second means connected to the first means to be responsive to the representation of the particular characteristic in the signal train and providing a second signal train representative thereof;

third means connected to the second means and providing a third signal train in respective response to the signals of the second train, including means for suppressing second signals following a nonsuppressed second signal within a predeterminable period, each third train signal corresponding to a nonsuppressed second train signal;

fourth means connected to provide pairs of spaced strobe pulses in response to each third train signals;

a data flip-flop connected to receive first signal train and to assume states in accordance with the digital data represented by the signals of the first train upon receiving the later one of each pair of strobe pulses; and means for strobing the fist signal train in response to each earlier one of a pair of strobing signals and connected to control the predeterminable period in response to the data bit held in the data flip-flop and the data bit represented by the signal of the first train at the time of the earlier strobing signal.

7. In a system for processing signals read from a storage carrier by means of a transducer and wherein digital signals are recorded on the carrier in a self-clocking track as a recurring particular characteristics having bit location and clock and bit value establishing significance, the combination comprising:

first means connected to the transducer means to provide a signal train wherein each signal represents a recurring bit location and clock or a bit value defining characteristic;

second means connected to the first means and operated in synchronism with signals as provided by the first means, to suppress signals occurring within a predeterminable period after each nonsuppressed signal;

a data recognition circuit connected to the first means to provide digital signals in representation of the recorded digital signals, further connected to operate in synchronism with the signals not suppressed by operation of the second means; and third means connected to the data recognition circuit and further connected to periodically control the duration of the predeterminable period in synchronism with the nonsuppressed signals and in response to data values as recognized by the data recognition circuit.

8. In a system as set forth in claim 7, the record carrier being a magnetic surface, the particular characteristic being flux direction reversal on the track, the first means producing a signal train in representation of each reversal as detected by the transducer;

the second means including gating means receiving the signals of the train, an output circuit connected to the gating means and including means to provide a disabling signal for a gating input of the gate and of controllable duration;

the data recognition circuit including a data flip-flop connected to the first and second means to assume states in synchronism with the signals permitted to pass the gate and in response to the signal as passed by the transducer means to the first means, the duration of the disabling signal being controlled in response to the states sequentially assumed by the data flip-flop.

9. In a system as set forth in claim 7, the second means providing suppression for signals occurring a predetermined period after a not suppressed signal, the third means periodically responsive to at least one data value to control particular modification of the predetermined period.

10. In a system as set forth in claim 7, the second means providing suppression of signals occurring a predetermined period after a not suppressed signal, the third means periodically responsive to at least one data value respectively periodically ascertained at the latest during each said predetermined period for controlling extension of the particular predetermined period.

11. In a system as set forth in claim 10, the third means responsive to pairs of successive data values, the later one ascertained at the latest during each predetermined period.

12. In a system for processing signals resulting from reproduction of magnetic recording of digital signals in the Manchester format, the signals having a clock pulse frequency fundamental and a second harmonic, comprising:

first circuit means connected to be responsive to the signals for deriving a pair of strobing pulses from each signal peak;

second circuit means connected to the first circuit means for controlling inhibition of particular ones of the pair of strobing pulses;

third circuit means connected to be responsive to the signal and to the pulses of the pair to provide representation of the relation of pairs of sequential digits as represented by the recording reproduce signals; and means connected to control the period of inhibition as provided by the second means in response to said representation of the relation of pairs.

13. In a system as set forth in claim 12, the third means providing a first control signal for a first relation of a pair of digital signals and a second control signal for a second relation, the second circuit means selectively providing a relatively short or a relatively long blanking period for inhibiting production of a pair strobing pulses in timed relation to each pair as produced and in respective response to the first and second control signals.

14. A reproducer of self-clocked digital data contained in a signal train characterized by the fact that only a portion of the signal transitions represent self-clock signals separating digital data bits, said reproducer including:

data storage means connected for receiving the signal train so that its inputs change in accordance with at least a portion of such signal train and whose output state changes only in accordance with enabling means connected to be responsive to at least a portion of such signal train as input for the storage means; an inhibiting means connected to the enabling means to provide thereto an inhibition pulse of variable duration, to suppress the portion of the signal train for the duration of the inhibition pulse;

first means connected to the data storage means for examining the nature of the current data in said storage means; and second means connected to the inhibition means and to the first means varying the duration of an inhibition pulse as initiated by the inhibiting means, the varying to follow an examination of the current data in said storage means.

15. In the reproducer claimed in claim 14, said fist means adapted to examine the binary value of the current data and said second means adapted to shorten such inhibit pulse for a predetermined binary value.

16. In the reproducer claimed in claim 14, said data storage means including flip flop means clocked by said enabling means in response to said self clock portion of the signal transition, said first means including a third means connected to said signal train for comparing the current data with the succeeding data and said second means adapted to shorten such inhibit pulse if the current data is similar to the succeeding data.

17. In the reproducer claimed in claim 14, said data storage including a flop flop means clocked by said enabling means in response to said self-clock portion of the signal transitions, said first means adapted to examine the binary value of said current data and said second means adapted to shorten such inhibit pulse for a predetermined binary value.

18. In the reproducer claimed in claim 14, said first means is connected to said signal train and adapted to compare the current data with the signal representing the data bit succeeding such current data.

19. In the reproducer claimed in claim 18, said second means adapted to shorten such inhibit pulse if the current data is similar to the succeeding data.

20. In a system for processing signals resulting from reproduction of occurrences of particular characteristics on a storage carrier, the particular characteristics representing digital data including the clock rate of data recording thereon, there being transducer means coupled to the storage carrier for providing a particular signal in response to each particular characteristic when passing the transducer means, the combination comprising:

first means connected to be responsive to the particular signals as provided by the transducer means to derive therefrom clock signals;

second means included in the first means to inhibit the production of a clock signal for a controllable period of time after each particular signal resulting in an uninhibited derivation of a clock signal;

third means connected to the transducer means and including the first means to provide first and second control signals respectively representing presence and absence of a particular signal about half a clock pulse period prior to a particular signal from which a clock pulse is derived;

means connected for controlling the duration of the controllable period in response to the first or second control signals to respectively cause the inhibition period to be shorter of longer; and means connected to the third means for deriving therefrom a data train at the rate of the clock pulses as provided by the first means.

21. In a system as set forth in claim 20, the third means including means for decoding the sequence of particular signals as provided by the transducer means to reproduce the values of the digital data and causing the first and second control signals to be provided on basis of the thus produced digital data.

* * * * *